Patented Feb. 24, 1953

2,629,737

UNITED STATES PATENT OFFICE 2,629,737

BASICALLY SUBSTITUTED AROYLBENZ-AMIDES AND SALTS THEREOF

Carl Peter Krimmel, Mundelein, Ill., assignor to G. D. Searle & Co., Chicago, Ill., a corporation of Illinois No Drawing. Application December 6, 1951, Serial No. 260,337

13 Claims. (Cl. 260—558)

The present invention is concerned with a new group of organic amides and, particularly, the basically substituted aroylbenzamides of the structural formula

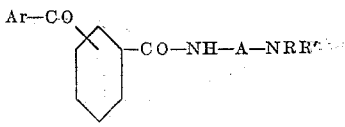

wherein Ar is a lower aryl radical, A is a lower, bivalent, aliphatic, hydrocarbon radical containing at least two carbon atoms, and NRR' is either a lower dialkylamino radical or a nitrogen-containing heterocyclic radical attached through a nitrogen in the heterocycle to the radical A.

In the above structural formula Ar is a lower aryl radical and, preferably, a monocyclic aromatic hydrocarbon radical. Typically, it may be a phenyl or a lower-alkylated phenyl radical such as tolyl, xylyl, ethylphenyl, cumyl, or cymyl. The radical Ar can also be a lower alkoxyphenyl radical such as anisyl, veratryl, or phenethyl.

The radical A is a straight-chained or branch-chained hydrocarbon radical such as ethylene, propylene, butylene, or hexylene; or a polymethylene radical such as trimethylene or octamethylene.

The radicals R and R' are lower alkyl radicals of the straight-chained and branch-chained type such as methyl, ethyl, propyl, butyl, amyl and hexyl. The radicals R and R' can also be combined to form a lower alkylene radical containing four to seven carbon atoms, four or five of which are in nuclear position as in the case of pyrrolidino, piperidino, 2,5-dimethylpyrrolidino, and 2,6-lupetidino radicals. They may also be combined as an ethyleneoxyethylene radical, ethylenethiaethylene radical, or ethyleneaminoethylene radical.

The bases described herein form salts with a variety of inorganic and strong organic acids such as phosphoric, hydrochloric, hydrobromic, hydriodic, sulfamic, acetic, maleic, malic, succinic, tartaric, citric, ascorbic, gluconic, benzoic, cinnamic, or related acids. They also form quaternary ammonium salts with a variety of organic esters of sulfuric, hydrohalic, and aromatic sulfonic acids. Among such esters are methyl chloride, bromide, and iodide; the ethyl halides, propyl halides, butyl halides, isobutyl halides, benzyl halides, phenethyl halides, naphthylmethyl halides, dimethyl sulfate, methyl benzenesulfonate, ethyl toluenesulfonate, ethylene chlorohydrin, ethylene bromohydrin, the propylene halohydrins, allyl chloride, methallyl bromide, and crotyl bromide.

The new group of amides described herein offers valuable intermediates in organic synthesis. The amides described are valuable medicinal agents with a potent effect on cardiovascular and renal functions.

The following examples illustrate my invention in further detail. However, they are in no way to be construed as limiting it in spirit or in scope. In these examples quantities of materials are given as parts by weight, temperatures as degrees Centigrade (° C.), and pressures during vacuum distillation as millimeters (mm.) of mercury.

Example 1 o-(p'-Toluyl)benzoic acid is prepared by the Friedel-Crafts reaction between toluene and phthalic anhydride, (cf. Heller and Schülke, Ber. Deut. Chem. Ges., vol. 41, page 3632, 1908). From this the acid chloride is prepared by treatment in carbon tetrachloride with excess thionyl chloride. The excess of the volatile reagents is removed by vacuum stripping and the residual acid chloride is used without further purification.

To a solution of 41 parts of o-(p'-toluyl)benzoyl chloride, dissolved in 350 parts of anhydrous ethyl ether, 21 parts of γ-diethylaminopropylamine are added dropwise with stirring. The gum which separates from the solution is extracted with dilute hydrochloric acid. The acid layer is separated and made alkaline with sodium hydroxide. The released oil is ether extracted, the extract is dried over anhydrous potassium carbonate, filtered and ether stripped. The residue is dissolved in ether and an equivalent of 25% hydrogen chloride in anhydrous isopropanol is added. The hydrochloride separates as a white, flocculent precipitate which is suction filtered, ether washed, and dried in a vacuum desiccator. Recrystallization from butanone yields a white crystalline produce melting at 160–162° C. The hydrochloride of N-(γ-diethylaminopropyl)-o-(p'-toluyl)benzamide has the structural formula

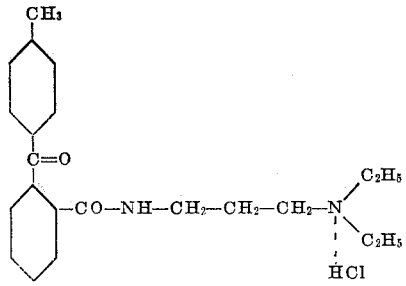

Example 2

A stirred solution of 129 parts of o-(p'-toluyl)-benzoyl chloride in 1000 parts of anhydrous ether is treated by dropwise addition with 51 parts of γ-dimethylaminopropylamine. The N-(γ-dimethylaminopropyl)-o-(p'-toluyl)benzamide is isolated as in Example 1 and yields a crystalline hydrochloride which, recrystallized from isopropanol, melts at 189–191° C.

Example 3

To a solution of 245 parts of o-(p'-toluyl)-benzoyl chloride in 2000 parts of ether, 100 parts of β-diethylaminoethylamine are added dropwise with stirring. The base is isolated as in Example 1. The hydrochloride of N-(β-diethylaminoethyl)-o-(p'-toluyl)benzamide, recrystallized from butanone, melts at 200–203° C.

Example 4

A stirred solution of 27 parts of o-(o'-anisoyl)-benzoyl chloride in 300 parts of anhydrous ether is treated by dropwise addition with 10 parts of α-methyl-β-dimethylaminoethylamine. The resulting mixture is extracted with water and the aqueous extract is washed with ether, rendered alkaline by addition of sodium hydroxide, and extracted with ether. This ether extract is dried over anhydrous potassium carbonate, filtered, and evaporated to yield the N-(β-dimethylaminopropyl)-o-(o'-anisoyl)benzamide as a high boiling, orange oil which has the structural formula

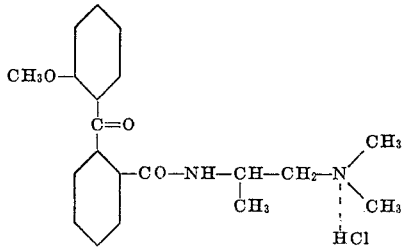

Example 5

To a stirred solution of 30 parts of p-benzoylbenzoyl chloride in 300 parts of anhydrous ether, 16 parts of γ-diethylaminopropylamine are added in small portions. The reaction mixture is extracted with water and the extract is washed with ether, rendered alkaline by addition of sodium hydroxide and extracted with ether. The resulting extract is dried over anhydrous potassium carbonate, filtered, and ether stripped to yield the N-(γ-diethylaminopropyl)-p-benzoylbenzamide as a high boiling amber oil which has the structural formula

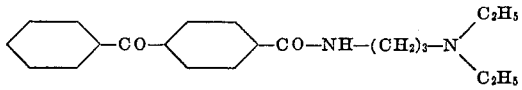

I claim:

1. A member of the class consisting of an N-di(lower)alkylamino(lower)alkyl substituted aroylbenzamide and salts thereof, wherein the two nitrogen atoms are separated by at least two carbon atoms and the aroyl radical is a member of the class consisting of benzoyl, nuclearly lower-alkylated benzoyl, and nuclearly lower-alkoxylated benzoyl radicals.

2. An N-di(lower)alkylamino(lower)alkyl substituted benzoylbenzamide wherein the two nitrogen atoms are separated by at least two carbon atoms.

3. An N-di(lower)alkylamino(lower)alkyl substituted aroylbenzamide wherein the two nitrogen atoms are separated by at least two carbon atoms and the aroyl radical is a nuclearly lower-alkylated benzoyl radical.

4. An N-di(lower)alkylamino(lower)alkyl substituted toluylbenzamide, wherein the two nitrogen atoms are separated by at least two carbon atoms.

5. An N-di(lower)alkylamino(lower)alkyl substituted o-toluylbenzamide, wherein the two nitrogen atoms are separated by at least two carbon atoms.

6. An N-di(lower)alkylamino(lower)alkyl substituted o-(p'-toluyl)benzamide wherein the two nitrogen atoms are separated by at least two carbon atoms.

7. An N-diethylamino(lower)alkyl-o-(p'-toluyl)benzamide, wherein the two nitrogen atoms are separated by at least two carbon atoms.

8. An N-di(lower)alkylamino(lower)alkyl substituted aroylbenzamide, wherein the two nitrogen atoms are separated by at least two carbon atoms and the aroyl radical is a nuclearly lower-alkoxylated benzoyl radical.

9. N-(γ-diethylaminopropyl)-p-benzoylbenzamide.

10. N-(γ-diethylaminopropyl)-o-(p'-toluyl)benzamide.

11. N-(β-diethylaminoethyl)-o-(p'-toluyl)benzamide.

12. N-(γ-dimethylaminopropyl)-o-(p'-toluyl)benzamide.

13. N-(β-dimethylaminopropyl)-o-(o'-anisoyl)benzamide.

CARL PETER KRIMMEL.

No references cited.